Aug. 21, 1962  H. ZIMMER  3,050,345
SAFETY BRAKE SYSTEM
Filed June 26, 1961
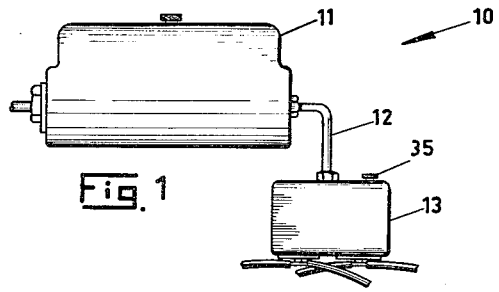
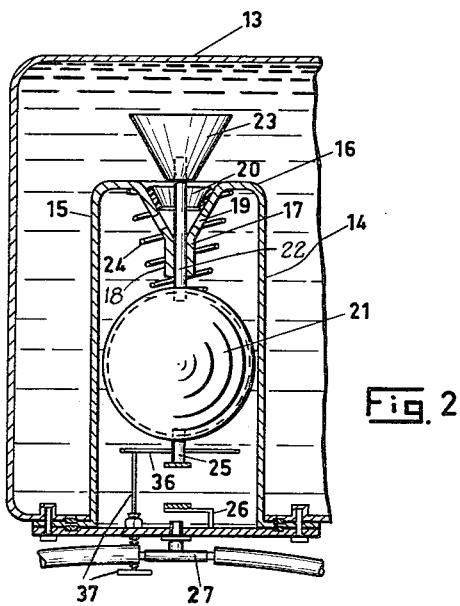
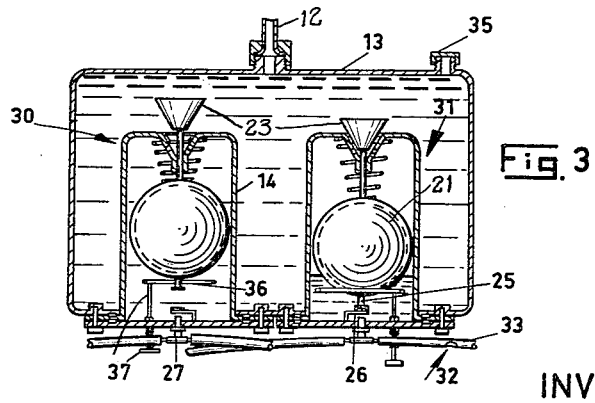
INVENTOR.
Heinrich Zimmer

United States Patent Office 3,050,345
Patented Aug. 21, 1962

3,050,345
SAFETY BRAKE SYSTEM
Heinrich Zimmer, Oakville, Ontario, Canada (% Canadian Research & Development Foundation, 1434 Queen St. W., Toronto 3, Ontario, Canada)
Filed June 26, 1961, Ser. No. 119,472
5 Claims. (Cl. 303—84)

This invention relates to improvements in vehicular braking systems and more particularly to hydraulic brake control systems.

Many hydraulic braking systems for vehicles have been designed wherein, upon pressure being applied to a brake pedal within the vehicle, connected to a master cylinder by suitable linkage, hydraulic fluid under pressure is communicated to the individual wheel cylinders through suitable conduit means, such a system having the disadvantage that a break in any single component of the system, renders the entire system inoperable. Other hydraulic braking systems have been designed, wherein the brakes of the rear wheels utilize a single braking circuit controlled by a single master cylinder, and the braking system of the vehicle's front wheels is controlled by a second master cylinder, this type of system having the disadvantage that, although partial braking is maintained, there is no immediate indication of a brake failure, due to the brake pedal action not being affected.

It is a further disadvantage of the previously described hydraulic brake system, that no alarm device within the vehicle is actuated, thereby advising the driver of a brake failure.

It is an object of this invention to provide a hydraulic brake safety control system in the following called control system, that will permit a portion of the braking system to remain operative in the event of a failure in any other part of the vehicle's braking system.

It is another object of this invention to provide a control system, that will indicate to the driver of the vehicle, by visual or other means, that a partial failure of the braking system has occurred.

It is a further object of this invention to provide a control system that will operate two separate braking systems, having one system connected to the front wheels, the other to the rear wheels, as an accessory to, rather than a replacement of, the existing braking system.

It is yet another object of this invention to provide a control system which will permit a standard type brake adjustment to be carried out.

It is yet another object of this invention to provide a control system so arranged that the control system and the master cylinder may be filled through one filler hole, thereby reducing the amount of time required to recharge the braking system with hydraulic fluid, and also reduce the entry of foreign matter into the braking system, through not requiring the removal of two or more filler caps.

It is still another object of this invention to provide a control system which will automatically indicate to the driver of the vehicle, which section of the braking system has failed.

It is further an object of this invention to provide a control system which will permit recharging the damaged area of the system only, concurrently eliminating any air therewithin, while automatically resetting the control system for normal use.

These and other objects and features of the invention will become apparent when taken in conjunction with the accompanying drawings in which:

FIG. 1 is a vertical, side elevation of a hydraulic braking system embodying this invention, showing particularly a master cylinder connected to a safety brake control unit.

FIG. 2 is a vertical, side sectional view showing particularly one valve unit of a safety brake control system.

FIG. 3 is a vertical, side sectional view of a hydraulic safety control unit, embodying this invention, illustrating particularly the valve unit action subsequent to a failure occurring in one part of the braking system.

Referring to FIG. 1, a safety brake control system indicated generally by arrow 10, comprising a master cylinder 11 of conventional design, connected by suitable conduit means 12, to a housing 13; housing 13 being of substantially elongated, rectilinear configuration and formed of substantially non-porous material such as, for instance, sheet steel or cast iron and the like.

Referring to FIG. 2, housing 13 encloses a plurality of cylindrical-like float valve chambers 14, float chambers 14 being closed at their top end 15 by a disc-like plate 16, which is depressed downwardly substantially centrally thereof, to form an inverted frusto-conical chamber of funnel-like configuration 17, and is adapted to provide therein valve guide means 18, a plurality of valve ports 19 and valve seats 20.

A float means 21 of substantially spherical configuration has attached to its upper side a valve stem 22, which projects upwardly through valve guide 18 and has threadably attached thereto a valve 23. Valve 23 is biased away from its valve seat 20, by the buoyancy of float 21 within float valve chamber 14, but closes upon the lowering of the fluid level, such as for instance, when a break in the fluid circuit of that part of the system to which this valve is connected, occurs. A spring 24, located within chamber 14, is adapted to bias downwardly float 21 thereby assisting valve 23 to close, but will not override the inherent buoyancy of float 21. Subsequent to a leak therefore the return stroke of any operation of the brake pedal within the vehicle will result in the volumetric replacement of the expelled fluid by air being drawn into chamber 14, providing thereby negative buoyancy of float 21 and assuring a definite closing of valve 23.

Upon float 21 reaching a predetermined lower level, a moving contact 25 is adapted to make with a stationary contact 26, thereby closing a circuit which will operate an alarm means within the vehicle, and remain closed until the faulty operation of the braking system has been repaired and recharged.

It will be noted that, although a portion of the braking system is now inoperable, the remaining portion of the braking system remains operative, thereby permitting the driver of the vehicle to proceed safely to a service depot.

It will be further noted that, float chamber 14 and its contents therein may be preassembled, and inserted as a unit within housing 13 through a hole means 26 provided for this purpose, and retained therein in an oil tight condition by conventional sealing means.

A T connection 27 is provided to communicate between float chamber 14 and the two wheels of the vehicle connected to this unit.

Referring to FIG. 3, housing 13 containing a plurality of float chambers 14 and 31 indicates valve 30 in an open position and valve 31 in closed position due to a break 32 in brake line 33, break 32 causing a rapid drop in fluid level within chamber 14 of valve 31, thereby lowering float 21 and closing contacts 25 and 26.

An air escape valve 35 is provided in housing 13 for convenience in the initial charging of the system with hydraulic fluid.

Upon depressing reset means 37, an attached lever 36 is adapted to raise float 21, thereby permitting fluid to enter chamber 14 to its normal level, concurrently expelling any air therein, whereupon contacts 25 and 26 are opened and normal operation may be resumed.

It will be noted that the organization of the invention is such as to enable ready removal of a damaged or defective float chamber 14 as a unit, and its replacement by a new unit or by a "calibration" unit, thus facilitating rapid repair in the event the control 10 becomes defective.

The general design of the individual parts of the invention as explained above may be varied according to requirements in regards to manufacture and production thereof, while still remaining within the spirit and principle of the invention, without prejudicing the novelty thereof.

The embodiments of this invention in which an exclusive property or privilege is claimed are defined as follows:

1. In a fluid-filled hydraulic brake system incorporating a master cylinder and a plurality of wheel cylinders, a safety device interposed between said master cylinder and said wheel cylinders and connected thereto by conduit means; said safety device including a fluid housing connected via said conduit means to said master cylinder, at least two float chambers detachably attached within said housing, said chambers having ports communicating with said housing and having passages connecting said chambers with said conduit means to said wheel cylinders; valve means cooperating with said ports; respective float means within said chambers attached to said valve means; said float means biasing said valve means away from said ports upon said chambers being filled with fluid and, conversely, covering said ports upon said chambers being emptied of fluid; and indicating means operable by said float means when any one of said chambers become emptied of fluid.

2. In a fluid-filled hydraulic brake system incorporating a master cylinder and a plurality of wheel cylinders, a safety device interposed between said master cylinder and said wheel cylinders and connected thereto by conduit means; said safety device including a fluid housing connected via said conduit means to said master cylinder; at least two float chambers detachably attached within said housing, said chambers each having a ported, frusto-conical valve seat communicating with said housing and a matching frusto-conical valve removably seated thereon; float means within said chamber connected to said valve means and moving said valve means off said seat and into said housing upon said chamber becoming filled with fluid and conversely moving said valve onto said seat upon said chamber becoming emptied of fluid; a passage connecting each of said chambers with said conduit means to said wheel cylinders; and electrical indication means operable by said float means upon said valve moving onto said seat.

3. A safety device as defined in claim 1 in which resilient means is applied to said float means to exert a force thereon less than and opposing the buoyancy of said float, said force ensuring positive indication by said indicating means upon said chamber becoming empty.

4. In a fluid-filled hydraulic brake system incorporating a master cylinder and a plurality of wheel cylinders, a safety device interposed between said master cylinder and said wheel cylinders and connected thereto by conduit means; said safety device including a fluid-filled housing connected to said master cylinder by said conduit means; at least two totally enclosed float chambers contained within said housing and readily detachable therefrom, each of said float chambers having a ported, frusto-conical valve seat communicating with said housing and a matching frusto-conical valve removably seated thereon; float means within said chamber connected to said valve means and moving said valve means off said seat and into said housing upon said chamber becoming filled with fluid and, conversely, moving said valve onto said seat upon said chamber becoming emptied of fluid, a passage connecting each of said chambers through said conduit means to an equal proportion of said wheel cylinders; electrical indication means including a live electrical circuit having an energizable indicator, a fixed contact attached to said chamber and a moving contact attached to said float, said contacts being connected in series in said circuit so that upon said chamber becoming emptied of fluid said float carries said moving contact towards said fixed contact and substantially coincident with said valve cooperating with said seat, both of said contacts cooperate to complete said circuit to energize said indicator; and resilient means applied to said float means to exert a force thereon, less than and opposing the buoyancy of said float, thereby maintaining positive connection between said contacts upon said chamber becoming empty of fluid.

5. A safety device as defined in claim 2 in which resilient means is applied to said float means to exert a force thereon less than and opposing the buoyancy of said float, said force ensuring positive indication by said indicating means upon said chamber becoming empty.

References Cited in the file of this patent

UNITED STATES PATENTS

| | | |
|---|---|---|
| 2,058,595 | Klein | Oct. 27, 1936 |
| 2,091,243 | Miller et al. | Aug. 24, 1937 |
| 2,169,462 | De Grace | Aug. 15, 1939 |
| 2,474,929 | Boler | July 5, 1949 |
| 2,614,003 | Brousseau et al. | Oct. 14, 1952 |

FOREIGN PATENTS

| | | |
|---|---|---|
| 635,209 | Germany | Sept. 12, 1936 |